(12) United States Patent
Wada et al.

(10) Patent No.: US 10,519,598 B2
(45) Date of Patent: Dec. 31, 2019

(54) METHOD FOR SUPPRESSING PITCH FORMATION

(71) Applicants: KURITA WATER INDUSTRIES LTD., Nakano-ku, Tokyo (JP); GUN EI CHEMICAL INDUSTRY CO., LTD., Takasaki-shi, Gunma (JP)

(72) Inventors: Satoshi Wada, Atsugi (JP); Yuko Okusa, Sagamihara (JP); Chigusa Taguchi, Saitama (JP); Yukio Abe, Takasaki (JP); Michiyasu Yamazaki, Takasaki (JP)

(73) Assignees: KURITA WATER INDUSTRIES LTD., Nakano-ku, Tokyo (JP); GUN EI CHEMICAL INDUSTRY CO., LTD., Takasaki-shi, Gunma (JP)

( * ) Notice: Subject to any disclaimer, the term of this patent is extended or adjusted under 35 U.S.C. 154(b) by 0 days.

(21) Appl. No.: 14/651,975

(22) PCT Filed: Dec. 26, 2013

(86) PCT No.: PCT/JP2013/085011
§ 371 (c)(1),
(2) Date: Jun. 12, 2015

(87) PCT Pub. No.: WO2014/104261
PCT Pub. Date: Jul. 3, 2014

(65) Prior Publication Data
US 2015/0322629 A1 Nov. 12, 2015

(30) Foreign Application Priority Data

Dec. 27, 2012 (JP) ................ 2012-285326
Dec. 25, 2013 (JP) ................ 2013-267280

(51) Int. Cl.
*D21C 9/08* (2006.01)
*D21H 17/48* (2006.01)
*D21H 21/02* (2006.01)

(52) U.S. Cl.
CPC ............. *D21C 9/086* (2013.01); *D21C 9/08* (2013.01); *D21H 17/48* (2013.01); *D21H 21/02* (2013.01)

(58) Field of Classification Search
CPC .......... D21H 21/02; D21H 17/48; D21C 9/08; D21C 9/086
See application file for complete search history.

(56) References Cited

U.S. PATENT DOCUMENTS

| 1,160,362 | A |  | 11/1915 | Baekeland |
| 2,785,975 | A |  | 3/1957 | Sheeran |
| 4,184,912 | A |  | 1/1980 | Payton |
| 4,772,359 | A |  | 9/1988 | Linhart et al. |
| 4,861,429 | A | * | 8/1989 | Barnett ............ D21F 1/30 162/199 |
| 4,895,622 | A |  | 1/1990 | Barnett et al. |
| 5,478,599 | A |  | 12/1995 | Iyer et al. |
| 5,670,021 | A |  | 9/1997 | Owens |
| 5,936,024 | A |  | 8/1999 | Ling et al. |
| 6,033,524 | A | * | 3/2000 | Pruszynski ............ D21H 21/10 162/158 |
| 6,090,905 | A | * | 7/2000 | Juzukonis ................ C08G 8/08 162/157.1 |
| 6,306,256 | B1 | * | 10/2001 | Rosengren ............ D21H 21/10 162/164.1 |
| 6,699,958 | B1 |  | 3/2004 | Detlefsen |
| 9,403,704 | B2 |  | 8/2016 | Ooi et al. |
| 2005/0039873 | A1 |  | 2/2005 | Curham et al. |

FOREIGN PATENT DOCUMENTS

| CA | 1080409 A | 7/1980 |
| CN | 101087825 A | 12/2007 |
| EP | 0377996 A1 | 7/1990 |
| EP | 2465593 A1 | 6/2012 |
| JP | S59-28676 A | 2/1984 |
| JP | S60-94687 A | 5/1985 |
| JP | H04-241184 A | 8/1992 |
| JP | H06-257082 A | 9/1994 |
| JP | H11-315491 A | 11/1999 |
| JP | 2000-290886 A | 10/2000 |
| JP | 2002-088628 A | 3/2002 |
| JP | 2005-255814 A | 9/2005 |
| JP | 4643125 B2 | 12/2010 |
| WO | 95/18001 A1 | 7/1995 |

(Continued)

OTHER PUBLICATIONS

Smook, Handbook for Pulp and Paper Technologists, 1992, Angus Wilde Publications, 2nd edition, chapter 14.*
Smook, Handbook for Pulp and Paper Technologists, 1992, Angus Wilde Publications, 2nd edition, chapter 15.*
Hesse et al., Phenolic Resins, 2005, Wiley-VCH, p. 1-16.*
PCT, "International Search Report for PCT/JP2013/085011".
China Patent Office, "Office Action for Chinese Patent Application No. 201380068180.0," dated Mar. 2, 2016.
Europe Patent Office, "Search Report for European Patent Application No. 13867325.6," dated Jul. 7, 2016.

(Continued)

*Primary Examiner* — Anthony Calandra
(74) *Attorney, Agent, or Firm* — Manabu Kanesaka

(57) ABSTRACT

Provided are a pitch-formation suppressor and the like which can be widely applied independently of the substance that causes a pitch and of the situation to generate a pitch in a paper manufacturing process, and which can effectively suppress and prevent the troubles due to the pitch, such as foreign spots and defects in a paper, breakage of a paper, and lowering of workability. This pitch-formation suppressor comprises an alkaline solution in which a phenol resin and/or a modified phenol resin is dissolved, or an acid solution in which a phenol resin and/or a modified phenol resin is dissolved.

10 Claims, No Drawings

(56) References Cited

FOREIGN PATENT DOCUMENTS

WO 2005/098133 A1 10/2005

OTHER PUBLICATIONS

China Patent Office, "Office Action for Chinese Patent Application No. 201380068180.0," dated Nov. 9, 2016.

* cited by examiner

METHOD FOR SUPPRESSING PITCH FORMATION

RELATED APPLICATIONS

The present application is National Phase of International Application No. PCT/JP2013/085011 filed Dec. 26, 2013, and claims priority from Japanese Applications No. 2012-285326, filed Dec. 27, 2012 and No. 2013-267280, filed Dec. 25, 2013, the disclosure of which is hereby incorporated by reference herein in its entirety.

TECHNICAL FIELD

The present invention relates to a pitch-formation suppressor, a method for suppressing pitch formation, and a method for manufacturing a deinked pulp; these can be used advantageously in manufacturing of a paper pulp. In more detail, the present invention relates to a pitch-formation suppressor with which troubles due to the pitch in the paper manufacturing process can be effectively suppressed and prevented, a method for suppressing pitch formation by the same, and a method for manufacturing a deinked pulp having a foreign matter such as a pitch removed therefrom.

BACKGROUND ART

Generally speaking, the pitch in the paper manufacturing process means a sticky resin component contained in a raw wooden material and a sticky synthetic substance contained in a recycled used paper, and also a hydrophobic sticky substance mainly comprising an organic substance derived from an added chemical used in the paper manufacturing process.

In the pulp manufacturing process to manufacture a pulp from a pulp raw material and in the paper making process to manufacture a paper from a pulp, at odd times there appear troubles due to the pitch. Namely, although the pitch is present in water as a colloid, when this colloidal state is damaged by a large shear force, by changes of pH and water temperature, by addition of a chemical, or the like, this pitch is separated out in water or on a paper-making equipment, or when agglomerates of fine pitches themselves which are separated out in water attach on a paper-making equipment, at odd times these may cause contamination of a product with the pitch agglomerates, poor squeeze out of water, breakage of a paper, and so forth. Because of these, there appear problems such as decrease in the product quality as well as decrease in the productivity because the equipment for paper making and so forth needs to be cleaned by stopping it.

The troubles due to the pitch appear readily, especially when a deinked pulp and a raw material of a used paper including a used carton box, as well as a broke raw material which reuses a waste paper, are used.

In recent years, the ratio of the used paper brought into a raw material is increasing and the unit consumption of industrial water is decreasing; and in proportion to these trends the amount of the pitch which is brought into the paper manufacturing process increases; and thus, not only the troubles due to the pitch is increasing but also they are becoming more complex.

To suppress the troubles due to the pitch, various methods have been proposed.

In Patent Document 1, it is described that a specific coagulating agent (a polymer which contains diallyl dimethyl ammonium chloride) is used to prevent the pitch from separating out.

In Patent Document 2, it is described that the pitch is suppressed by using a flocculant.

In Patent Document 3, it is described that the pitch is adsorbed to a talc.

In Patent Document 4, it is described a pitch anti-fouling agent for paper making which comprises a nonionic surfactant and a polymer comprising, as composition units, maleic acid or maleamidic acid, as well as isobutylene, diisobutylene, or styrene.

In Patent Document 5, it is described that the pitch is decomposed by an enzyme which is derived from a specific microorganism.

CITATION LIST

Patent Document

Patent Document 1: Japanese Patent Laid-Open Publication No. H04-241184
Patent Document 2: Japanese Patent Laid-Open Publication No. H06-257082
Patent Document 3: Japanese Patent Laid-Open Publication No. S60-94687
Patent Document 4: Japanese Patent Application Publication No. S59-28676
Patent Document 5: Japanese Patent No. 4643125

SUMMARY OF THE INVENTION

Problems to be Solved by the Invention

In the case that an cationic polymer is used as the coagulating agent as shown in Patent Document 1, the action mechanism thereof involves to fix the pitch to pulps, which is considered to have a negative charge, by the cationic polymer; and therefore, in this case, an appropriate amount of the cationic polymer having appropriate molecular weight and chemical structure needs to be used. If this is used under inappropriate conditions, there may be a risk to coagulate the pitches among themselves thereby worsening the problem furthermore. Besides, because this is a reaction which involves the charges, the action is poor in the pitch having a high hydrophobicity.

In the case that a flocculant is used as shown in Patent Document 2, there is a problem that because the chemical is cationic, an ink and the like which show an anionic character is readily fixed to fibers whereby causing a problem of decrease in brightness of a pulp. There is another problem that the yield of the pulp decreases because the fibers are discharged outside the system together with the froth by forming a flock.

In the case that a talc is used as shown in Patent Document 3, adsorption of the pitch to the talc is not necessarily sufficient so that a large quantity thereof needs to be added therein. In addition, because it is in the form of powders, there is a problem that the equipment for it is abraded so that the exchange frequency of the equipment becomes higher.

In the case that a surfactant is used as shown in Patent Document 4, in order to obtain a sufficient effect, this surfactant needs to be added as a high concentration solution in order that the pitch may be dissolved; and therefore, there is a problem to cause foaming of the surfactant, which causes in turn poor dehydration in a wire. In addition, this may lead to decrease in the product quality by contamination of the product with a scum which is attached to the foams, and also may lead to reseparation of the pitch in the later stage of the processes. Therefore, this may not provide a fundamental solution to the problems.

In the case that an enzyme derived from a microorganism is used as shown in Patent Document 5, because of a substrate specificity an advantageous effect may not be obtained depending on the kind of the pitch; and in addition, a long time of period is necessary before the effect thereof appears, so that this may cause a problem of the pitch attachment during this period.

The present invention was made in view of the situation as mentioned above, and therefor has objects to provide a pitch-formation suppressor as well as a method for suppressing pitch formation, with which the troubles due to the pitch can be effectively suppressed even if the pitch is present with a high concentration, or the pitch is highly hydrophobic, as well. In addition, the present invention has an object to provide a method for manufacturing a deinked pulp having a foreign matter such as a pitch removed therefrom.

Means for Solving the Problems

Inventors of the present invention carried out an extensive investigation to achieve the objects as mentioned above; and as a result, they obtained the following information.

That is, it was found that an alkaline solution in which a phenol resin and/or a modified phenol resin is dissolved or an acid solution in which a phenol resin and/or a modified phenol resin is dissolved acts effectively by a hydrophobic interaction even to the pitch having a high hydrophobicity whose treatment has been difficult in the past, whereby it becomes possible to suppress the troubles due to the pitch; and in addition, it was found that the troubles due to the pitch can be effectively prevented from occurring in the paper manufacturing process by using the said alkaline solution or the said acid solution as the pitch-formation suppressor.

The present invention was completed by the information as mentioned above.

Namely, the present invention provides the following (1) to (13).

(1) A pitch-formation suppressor comprising an alkaline solution in which a phenol resin and/or a modified phenol resin is dissolved, or an acid solution in which a phenol resin and/or a modified phenol resin is dissolved.

(2) The pitch-formation suppressor according to (1), wherein the phenol resin and/or the modified phenol resin is at least one resin selected from a novolak phenol resin, a resol phenol resin, a modified phenol resin, and a secondarily reacted phenol resin which is obtained by secondarily reacting these resins as raw material resins.

(3) The pitch-formation suppressor according to (2), wherein the secondarily reacted phenol resin is a resin which is obtained by adding an aldehyde to an alkaline solution of the raw material resin whereby reacting the aldehyde with the raw material resin.

(4) The pitch-formation suppressor according to any one of (1) to (3), wherein the modified phenol resin is a product of a Mannich reaction between a phenol and/or a phenol resin with an amine and an aldehyde.

(5) A method for suppressing pitch formation, wherein the pitch-formation suppressor according to any one of (1) to (4) is added in a paper manufacturing process.

(6) The method for suppressing pitch formation according to (5), wherein a cationic polymer is used concurrently therewith.

(7) The method for suppressing pitch formation according to (5) or (6), wherein the pitch-formation suppressor is added into at least one selected from a chest, a pipe, an appliance, and a washing shower in at least one process, among the paper manufacturing processes, selected from a pulp manufacturing process, a washing and refining process, a preparation process, a paper making process, and a white water recovery process.

(8) The method for suppressing pitch formation according to any one of (5) to (7), wherein the pitch-formation suppressor is added into at least one selected from a chemical pulp, a mechanical pulp, and a used paper pulp in a pulp manufacturing process, a broke and a disk filter in a pulp recovery process, and a mixing chest, a machine chest, a seed box, and an inlet in a paper making process.

(9) The method for suppressing pitch formation according to (8), wherein the pitch-formation suppressor is added to a process water in which concentration of suspended matters is 1.0% or less by mass.

(10) The method for suppressing pitch formation according to any one of (5) to (9), wherein the pitch-formation suppressor is added into a floatation process and/or a process before it in a deinking treatment of a used paper pulp manufacturing process in the paper manufacturing processes.

(11) A method for manufacturing a deinked pulp wherein the pitch-formation suppressor according to any one of (1) to (4) is added into a pulp slurry in a deinking process.

(12) The method for suppressing pitch formation according to (7), wherein the pitch-formation suppressor is added to at least one selected from a wire, a felt, a canvas, a roll, and a suction roll among the appliances.

(13) The method for suppressing pitch formation according to (7), wherein the washing shower is a shower with which fouling of at least one selected from the appliance, the chest, and the equipment is prevented from occurring.

Advantageous Effects of Invention

According to the present invention, the troubles due to the pitch can be effectively suppressed even if in the paper manufacturing process, not only the pitch is present with a high concentration but also the pitch is highly hydrophobic.

DESCRIPTION OF THE EMBODIMENTS

Firstly, the pitch-formation suppressor of the present invention will be explained.

[Pitch-Formation Suppressor]

The pitch-formation suppressor of the present invention comprises an alkaline solution in which a phenol resin and/or a modified phenol resin is dissolved, or an acid solution in which a phenol resin and/or a modified phenol resin is dissolved.

According to the present invention, the troubles due to the pitch can be effectively suppressed even if in the paper manufacturing process, not only the pitch is present with a high concentration but also the pitch is highly hydrophobic.

A detail of the mechanism how the present invention expresses the suppression effect to the troubles due to the pitch has not been clear yet; however, it may be assumed as follows. That is, the phenol resin and/or the modified phenol resin, which is present in the pitch-formation suppressor and is dissolved in an alkaline solution or an acid solution, generates a hydrophobic interaction with the pitch that is present in water or with the pitch that is attached to the paper raw material thereby effecting to cover a part or an entirety of the pitch; and then, this covered pitch is separated out by some action to form the separated product. Alternatively, it may be assumed that the phenol resin and/or the modified phenol resin include the pitch by some action to separate it out whereby forming the separated product. The separated product thus formed, comprising the pitch and the phenol resin and/or the modified phenol resin, has a lower viscosity as compared with the separated product of the pitch only, so that agglomeration in the process as well as attachment of the pitch to the appliance can be suppressed, so that the troubles due to the pitch can be reduced.

In the phenol resin having an ionic property, by using it together with an appropriate charge-controlling agent (cationic polymer, aluminum sulfate, and anionic polymer), separation of the phenol resin can be facilitated by the charge neutralization, and the interaction with the pitch can be increased; and in addition, it can facilitate fixing to the anionic pulp fibers while keeping the particle formed by the said interaction very small in its particle diameter; and as a result, this does not cause the troubles due to the pitch.

Alternatively, in the floatation process and/or in the process before it in the deinking treatment, the phenol resin that is separated out by some action is separated out with including the pitch in it whereby it is attached to air foams whose hydrophobicity is higher than the pulp fibers, and then the foams are discharged outside the system by the floatator.

<Phenol Resin and/or Modified Phenol Resin>

As to the phenol resin and/or the modified phenol resin contained in the pitch-formation suppressor of the present invention, a novolak phenol resin, a modified phenol resin thereof, a resol phenol resin, a modified phenol resin thereof, and these phenol resins and modified phenol resins which are treated with a secondary reaction. These may be used singly or as a combination of two or more of them.

Illustrative example of the resin which is treated with the secondary reaction includes a resin having a controlled molecular weight which is obtained by adding an aldehyde to an alkaline solution of a phenol resin whereby reacting the aldehyde with the phenol resin.

Illustrative example of the modified phenol resin includes a product of a Mannich reaction between a phenol and/or a phenol resin with an amine and an aldehyde.

The above-mentioned novolak phenol resin is the phenol resin which is obtained by reacting a phenol with an aldehyde in the presence of an acid catalyst; and the resol phenol resin is the phenol resin which is obtained by reacting a phenol with an aldehyde in the presence of a base catalyst.

The weight-average molecular weight of the phenol resin and/or the modified phenol resin is not particularly restricted; however, if the molecular weight thereof is too small, there is a possibility that the covering effect to the pitch becomes lower and that the separation efficiency of the separated product becomes lower; on the other hand, if the molecular weight thereof is too large, there is a possibility that the separated product becomes a large foreign matter enough to cause the adverse effect in the paper manufacturing. Therefore, the molecular weight thereof is, for example, in the range of 500 to 60,000, preferably in the range of 1,000 to 60,000, or more preferably in the range of 1,000 to 30,000.

(Phenols)

Illustrative example of the phenols which can be used for production of the novolak phenol resin and the resol phenol resin includes a phenol, each isomer of cresol, each isomer of ethyl phenol, each isomer of xylenol, alkyl phenols such as butylphenol, unsaturated alkyl phenols such as cardanol, aromatic polycyclic phenols such as each α,β-naphthol, polyvalent phenols such as bisphenol A, bisphenol F, bisphenol S, pyrogallol, resorcin, and catechol, and hydroquinone, though not limited to them at all. These phenols may be used singly or as a mixture of two or more of them.

(Aldehydes)

Illustrative example of the aldehydes which can be used for production of the novolak phenol resin and the resol phenol resin includes formaldehyde, paraformaldehyde, acetaldehyde, propyl aldehyde, benzaldehyde, salicylaldehyde, and glyoxal, though not limited to them at all. These aldehydes may be used singly or as a mixture of two or more of them.

(Amines)

Illustrative example of the amines used in the Mannich reaction for production of the modified phenol resin includes isophorone diamine, m-xylene diamine, diethylene triamine, diethanol amine, and N-methyl ethanolamine, though not limited to them at all. These amines may be used singly or as a mixture of two or more of them.

Meanwhile, as to the aldehydes to be used in the Mannich reaction, the same aldehydes as those exemplified in explanation of the aldehydes to be used for production of the novolak phenol resins and of the resol phenol resins may be mentioned.

<Alkaline Solution or Acid Solution>

In the pitch-formation suppressor of the present invention, an alkaline solution or an acid solution is used.

As to the alkaline solution, in order to sufficiently dissolve the phenol resin and/or the modified phenol resin, an aqueous solution of an alkaline metal hydroxide is preferable. Preferable example of the alkaline metal hydroxide includes sodium hydroxide, potassium hydroxide, and lithium hydroxide, though sodium hydroxide is more preferable. In the case that the alkaline solution is used as the pitch-formation suppressor, pH of the pitch-formation suppressor is not particularly restricted as far as it is alkaline; however, in order to sufficiently dissolve the phenol resin and/or the modified phenol resin, pH thereof is preferably in the range of 8 to 14, or more preferably in the range of 11 to 14.

As to the acid solution, an inorganic acid solution and an organic acid solution can be mentioned; however, in order to sufficiently dissolve the phenol resin and/or the modified phenol resin, an inorganic acid solution is preferable. Preferable example of the inorganic acid solution includes hydrochloric acid, sulfuric acid, nitric acid, and phosphoric acid, though hydrochloric acid, sulfuric acid, or nitric acid is more preferable, though hydrochloric acid is still more preferable. In the case that the acid solution is used as the pitch-formation suppressor, pH of the pitch-formation suppressor is not particularly restricted as far as it is acidic; however, in order to sufficiently dissolve the phenol resin and/or the modified phenol resin, pH thereof is preferably in the range of 1 to 5.

<Solvent>

As to the solvent in the alkaline solution or the acid solution to be used in the pitch-formation suppressor of the present invention, although water is used advantageously, water may contain other solvent. Water content in the solvent is 80% or more by mass, preferably 90% or more by mass, more preferably 95% or more by mass, still more preferably 99% or more by mass, or further still more preferably 100% by mass.

As to the other solvent, there is no particular restriction; and illustrative example thereof includes ketones such as acetone; esters such as ethyl acetate; water-dissolvable organic solvents including an alcohol such as methanol; or amines.

<Contents of the Essential Components in the Pitch-Formation Suppressor>

Total contents of the phenol resin and/or the modified phenol resin and the base or the acid in the components other than the solvent in the pitch-formation suppressor (non-solvent components of the pitch-formation suppressor) is, in order to obtain the enhanced effect to suppress the troubles due to the pitch, preferably 80% or more by mass, more preferably 90% or more by mass, still more preferably 95% or more by mass, further still more preferably 99% or more by mass, or in particular, further still more preferably 100% by mass.

Namely, as far as the object of the present invention is not damaged, an arbitrary component such as other resin may be contained in the pitch-formation suppressor; and the content of the arbitrary component in the non-solvent components of the pitch-formation suppressor is preferably 20% or less by mass, more preferably 10% or less by mass, still more preferably 5% or less by mass, and further still more preferably 1% or less by mass; or in particular, further still more preferably there is no such component contained therein.

[Method for Producing the Pitch-Formation Suppressor]

There is no particular restriction as to the method for producing the pitch-formation suppressor. For example, it can be advantageously produced by dissolving the phenol resin and/or the modified phenol resin into the alkaline solution or the acid solution.

In addition, the solvent used in the synthesis of the phenol resin and/or the modified phenol resin may be used as it is in the state of solution without removing it by distillation to obtain the pitch-formation suppressor. In this case, if necessary, shortfall amount of the solvent may be added therein; and in addition, an arbitrary component may be added therein if necessary.

Next, the method for suppressing pitch formation of the present invention will be explained.

[Method for Suppressing Pitch Formation]

The method for suppressing pitch formation of the present invention is characterized by addition of the above-mentioned pitch-formation suppressor in the paper manufacturing process.

In the method for suppressing pitch formation of the present invention, it is preferable to add the pitch-formation suppressor into, for example, various chests and/or pipes, or into a washing shower in the pulp manufacturing process, the washing and refining process, the preparation process, the paper making process, and the white water recovery process among the paper manufacturing processes. Especially it is preferable to add the pitch-formation suppressor into a chemical pulp, a mechanical pulp, or a used paper pulp in the pulp manufacturing processes; or into a broke or a disk filter in the pulp recovery process; or into a mixing chest, a machine chest, a seed box or an inlet, a white water silo, a seal pit, a white water recovery water in the paper making process; or into a floatation process and/or a process before it in the deinking treatment of the used paper pulp manufacturing process. In addition, it is preferable to add the pitch-formation suppressor into a process water in which concentration of suspended matters is 1.0% or less by mass. Among the process waters with the concentration of suspended matters being 1.0% or less by mass, especially the white water silo, the seal pit, and the white water recovery water are more preferable.

After the pitch-formation suppressor is added in the way as mentioned above into the process water in which concentration of suspended matters is 1.0% or less by mass, this may be circulated to the pulp raw material system in which concentration of suspended matters is more than 1.0% by mass.

In addition, it is preferable that the pitch-formation suppressor be added in the paper manufacturing appliances such as a wire, a felt, a canvas, a roll, and a suction roll; and in addition, addition of the pitch-formation suppressor to the washing shower is preferably done to the shower with which the fouling of various appliances, chests, or equipment may be prevented from occurring.

The site at which the pitch-formation suppressor is added in the paper manufacturing process is not particularly restricted. Preferable is the site where stirring is surely taking place so that the chemical and the pitch may surely interact; and thus, for example, the suction side of the pump with which the pulp is transported from the tanks that are installed in each process is preferable.

Addition amount of the pitch-formation suppressor as the amount of the active ingredient contained therein is preferably in the range of 1 to 10,000 g relative to 1,000 kg of the pulp. If the amount of the active ingredient is 1 g or more relative to 1,000 kg of the pulp, the preventive effect for attachment of the pitch can be expressed sufficiently. On the other hand, if the amount of the active ingredient is 10,000 g or less relative to 1,000 kg of the pulp, it is economically advantageous. From the above view point, the addition amount of the pitch-formation suppressor is preferably in the range of 5 to 8,000 g, or more preferably in the range of 10 to 6,000 g, relative to 1,000 kg of the pulp.

In addition, this pitch-formation suppressor may be added separately in plural sites in the paper manufacturing process. For example, it may be added in the floatator in the pulp manufacturing process and in the machine chest in the paper making process. Meanwhile, the term "active ingredient" means the resin component in the pitch-formation suppressor.

In addition, the way how to add the pitch-formation suppressor in the paper manufacturing process includes the followings: it is added or directly sprayed to the place where the dirt is attached, or to the tank or the pipe of the showering water for washing and for sealing; the tank or the pipe being installed near to the said place.

In the case that the pitch-formation suppressor is added through the showering water, the addition amount as the active ingredient therein is preferably in the range of 1 to 100,000 mg relative to 1 liter of the showering water. If the amount of the active ingredient is 1 mg or more relative to 1 liter of the showering water, the preventive effect for attachment of the pitch can be expressed sufficiently. On the other hand, if the amount of the active ingredient is 100,000 mg or less relative to 1 liter of the showering water, it is economically advantageous. From the above view point, the addition amount of the pitch-formation suppressor is preferably in the range of 5 to 2,000 mg, or more preferably in the range of 10 to 1,000 mg, relative to 1 liter of the showering water.

Meanwhile, the pitch-formation suppressor may be added to the showering water continuously or intermittently. As to the equipment to which the pitch tends to be readily attached, for example, a wire, a felt, and a roll may be mentioned.

<Concurrent Use with Other Chemicals>

Together with the pitch-formation suppressor of the present invention, other active ingredient, for example, a cationic polymer may be concurrently used.

Illustrative example of the cationic polymer includes an amine-epichlorohydrin resin, a diallyl amine (DAA) polymer, a diallyl dimethyl ammonium chloride (DADMAC) polymer, and polyethylene imine; these having the weight-average molecular weight of several ten thousands to several ten millions. These may be used singly or as a combination of two or more of them.

In the case when the cationic polymer is concurrently used, as the phenol resin and/or the modified phenol resin, a resin other than the product of the Mannich reaction is preferable.

In view of the performance as the pitch-formation suppressor, the mixing amount of the cationic polymer relative to the phenol resin and/or the modified phenol resin is preferably in the range of about 0.005 to about 1 meq/L as the colloid equivalent amount at the time of mixing.

In addition, an aluminum compound may be used in combination with the pitch-formation suppressor of the present invention. The aluminum compound is not particularly restricted; and illustrative example thereof includes aluminum compounds such as aluminum sulfate, aluminum chloride, polyaluminum chloride, alumina sol, aluminum silicate, and aluminum nitrate. Adding amount of the aluminum compound as the amount of the active ingredient is preferably in the range of 1 to 100,000 g relative to 1,000 kg of the pulp.

[Method for Producing the Deinked Pulp]

The method for producing the deinked pulp of the present invention is characterized by that the pitch-formation suppressor is added into a pulp slurry in the deinking process.

<Specific Production Example of the Deinked Pulp>

In the present invention, the deinked pulp may be produced by the same way as heretofore known methods for producing the deinked pulp. For example, firstly raw material used papers are added to an aqueous solution of sodium hydroxide and sodium silicate; and after the used papers are disaggregated by means of a pulper (pulp disaggregation equipment) to make them a pulp slurry, the pulp slurry is kneaded with a deinking agent (for example a nonionic surfactant) by a kneader to remove the printing ink from the pulp. Then, after it is bleached in a tower to which hydrogen peroxide is added, foreign matters such as an ink, an ash, and the pitch are separated by floatation by means of the floatator thereby discharging them outside the system as the froth. Thereafter, the water in the pulp slurry is removed by means of an extractor or the like; and after the pulp is resuspended in water, the pulp is washed by a filter, so that the deinked pulp (DIP) can be obtained. The pitch-formation suppressor of the present invention may be added to the floatator, or in the stage prior to it; however, it is preferable to be added immediately prior to the floatator. From the view point to reduce the fouling by the pitch in the paper making process after this stage as well as to reduce the defect in the product, it is preferable that the pitch-formation suppressor be added both to the floatator and to the step prior to it.

In the floatator, air bubbles are blown into the pulp slurry to attach the foreign matter such as an ink to the foams whereby floating them to be separated from the pulp fibers. In this case, a heretofore known organic deinking agent may also be added thereto.

If the floatation is carried out by adding the pitch-formation suppressor of the present invention, the foreign matters such as the removed ink and the pitches interact with the pitch-formation suppressor to form a colloid. This colloid is attached to the foams which are more hydrophobic than the pulp fibers; and as a result, these are floated to be separated. By this way, the removal rate of the foreign matters such as the ink and the pitch in the pulp slurry can be increased; and therefor that brightness of the paper product obtained by blending with the obtained deinked pulp can be improved; the drawbacks by the foreign matters as well as breakage of the paper can be reduced; yield, filterability, and quality of the product such as the paper strength can be improved; and the productivity and the operability may be improved. In addition, because of these improvements, the blending ratio of the deinked pulp may be increased; and as a result, it becomes possible to reduce the cost due to the pulp raw material in the production cost.

By so doing, the deinked pulp having the foreign matters such as the ink and the pitch removed therefrom can be used advantageously as the used paper raw material to manufacture a newspaper, a journal paper, an OA paper, a medium grade printing paper, a flier paper, a carton box paper, and so forth.

EXAMPLES

Next, the present invention will be explained by Examples; however, the present invention is not restricted at all by these examples.

Production Example 1: Production of the Pitch-Formation Suppressor (PC Material) I As the raw material resin, Resitop PSM-4324 (manufactured by Gunei Chemical Industry Co., Ltd.) was used. This material is the novolak phenol resin with the weight-average molecular weight of 2,300 obtained by polycondensation of phenol with formaldehyde in the presence of an acid catalyst.

In a beaker, 64.0 g of PSM-4324, 126.4 g of ion-exchanged water, and 9.6 g of an aqueous sodium hydroxide solution with the concentration of 48% by mass were taken; and then, the resulting mixture was stirred by a magnetic stirrer to dissolve them, whereby 200 g of the alkaline solution (PC Material I) of the novolak phenol resin containing 32% by mass of PSM-4324 was obtained. This solution showed pH of 12.2.

Production Example 2: Production of the Pitch-Formation Suppressor (PC Material) II As the raw material resin, Resitop PSM-6358 (manufactured by Gunei Chemical Industry Co., Ltd.) was used. This material is the novolak phenol resin with the weight-average molecular weight of 5,400 obtained by polycondensation of phenol with formaldehyde in the presence of an acid catalyst.

In a beaker, 41.0 g of PSM-6358, 146.2 g of ion-exchanged water, and 12.8 g of an aqueous sodium hydroxide solution with the concentration of 48% by mass were taken; and then, the resulting mixture was stirred by a magnetic stirrer to dissolve them, whereby 200 g of the alkaline solution (PC Material II) of the novolak phenol resin containing 20.5% by mass of PSM-6358 was obtained. This solution showed pH of 12.4.

In the conical flask with a ground stopper was taken 100 g of the above-mentioned solution; and after it was heated to about 60° C., 4.43 g of an aqueous formaldehyde solution with the concentration of 37% by mass was added to it. Thereafter, a condenser, an inlet tube of a nitrogen gas for agitation, and a thermometer were attached to the ground stopper; and then, it was heated with the solution temperature of 85° C. for 8 hours in an oil bath to carry out the resol-type addition polycondensation reaction of formaldehyde (resol-type secondary reaction) whereby lowering the ratio of the low-molecular weight components including the bi-nuclear phenol body, whereby the weight-average molecular weight thereof was raised. Thereafter, this was cooled; and then, 4.46 g of ion-exchanged water (for adjustment of the concentration) was added to it to obtain the alkaline solution (PC Material II) of the secondarily reacted phenol resin. The concentration of the resin component (active ingredient) in this solution was 19.4% by mass; the weight-average molecular weight of this resin was 13,400; and pH of the solution was 11.7.

Production Example 3: Production of the
Pitch-Formation Suppressor (PC Material) III Into a separable flask equipped with a stirrer, a thermometer, and a reflux condenser was taken 450.0 g of cresol; and then, 200.0 g of an aqueous solution of formaldehyde with the concentration of 37% by mass was added to it. Thereafter, as the catalyst, 3.0 g of oxalic acid was added to it; and then, after the resulting mixture was heated by a heater to 95° C. with stirring the system, the reaction was carried out for 4 hours with keeping this temperature. Then, the dehydration and concentration was carried out under a normal pressure with raising the temperature to 200° C.; and, when the temperature reached 200° C., the unreacted cresol was distilled out under the reduced pressure of 5.3 kPa. In this way, 350 g of the yellow and transparent novolak cresol resin (weight-average molecular weight of 2,000) was obtained.

Into a separable flask equipped with a stirrer, a thermometer, and a reflux condenser were taken 110 g of the cresol resin thus obtained and 110 g of ethanol; and then, after the resulting mixture was heated to 70° C. by a heater, it was stirred for 2 hours to dissolve the cresol resin into ethanol. Then, after this resin solution was cooled to 40° C. or lower, 57.8 g of diethanol amine was added to it, which was then followed by addition of 4.50 g of an aqueous solution of formaldehyde with the concentration of 37% by mass. Thereafter, the temperature was raised to 70° C. with stirring the system; and then, this was kept for 15 hours to modify the cresol resin by diethanol amine. Then, after the system was cooled to 40° C. or lower, 55.0 g of hydrochloric acid with the concentration of 3.6% by mass was added to it. After this mixture was well stirred to make it a homogeneous solution, ethanol was distilled out by heating under reduced pressure; and finally, appropriate amount of ion-exchanged water was added into it to adjust the concentration thereof. In this way, the acid solution (PC Material III) of the product of the Mannich reaction of the cresol resin was obtained. The concentration of the resin component (active ingredient) in this solution was 15.8% by mass; and pH of the solution was 1.8.

Production Example 4: Production of the
Pitch-Formation Suppressor (PC Material) IV As the raw material resin, Resitop PSM-6358 (manufactured by Gunei Chemical Industry Co., Ltd.) was used. This material is the novolak phenol resin with the weight-average molecular weight of 5,400 obtained by polycondensation of phenol with formaldehyde in the presence of an acid catalyst.

Into a separable flask equipped with a stirrer, a thermometer, and a reflux condenser were taken 200 g of PSM-6358 and 400.0 g of methanol; and then, after the resulting mixture was heated to 40° C. by a heater, it was stirred for 1 hour to dissolve PSM-6358 into methanol. Then, 400.0 g of ion-exchanged water was added to it. By this operation a resin was separated out, and then, the solid-liquid separation thereof was carried out. Then, by carefully removing the portion of the separated solution, a resin was obtained. The resin thus obtained was further treated with the same operation twice to finally obtain 40.0 g of the resin.

Next, into a beaker were taken 40.0 g of the obtained resin, 209.5 g of ion-exchanged water, and 16.5 g of an aqueous solution of sodium hydroxide with the concentration of 48% by mass; and then, the resulting mixture was dissolved by stirring with a magnetic stirrer to obtain 266 g of the alkaline solution (PC Material IV) of the separation-purified novolak phenol resin. The concentration of the resin component (active ingredient) in this solution was 15.0% by mass; the weight-average molecular weight of this resin was 9,200; and pH of the solution was 11.8.

Production Example 5: Production of the
Pitch-Formation Suppressor (PC Material) V Into a separable flask equipped with a stirrer, a thermometer, and a reflux condenser was taken 450.0 g of cresol; and then, 200.0 g of an aqueous solution of formaldehyde with the concentration of 37% by mass was added to it. Thereafter, as the catalyst, 3.0 g of oxalic acid was added to it; and then, after the resulting mixture was heated by a heater to 95° C. with stirring the system, the reaction was continued for 4 hours with keeping this temperature. Then, the dehydration and concentration was carried out under a normal pressure with raising the temperature to 200° C.; and, when the temperature reached 200° C., the unreacted cresol was distilled out under the reduced pressure of 5.3 kPa. In this way, 350 g of the yellow and transparent novolak cresol resin (weight-average molecular weight of 2,000) was obtained.

Then, into a beaker, 40.0 g of the obtained resin, 209.5 g of ion-exchanged water, and 16.5 g of an aqueous sodium hydroxide solution with the concentration of 48% by mass were taken; and then, the resulting solution was stirred by a magnetic stirrer to dissolve them, whereby 266 g of the alkaline solution (PC Material V) of the novolak cresol resin was obtained. The concentration of the resin component (active ingredient) in this solution was 15.0% by mass; and pH of the solution was 11.7.

Production Example 6: Production of the
Pitch-Formation Suppressor (PC Material) VI In the conical flask with a ground stopper was taken 100.0 g of PC Material V; and after it is heated to about 60° C., 3.02 g of an aqueous formaldehyde solution with the concentration of 37% by mass was added to it. Thereafter, a condenser, an inlet tube of a nitrogen gas for agitation, and a thermometer were attached to the ground stopper; and then, the resulting mixture was heated at the solution temperature of 85° C. for 8 hours in an oil bath to carry out the resol-type addition-polycondensation reaction of formaldehyde (resol-type secondary reaction) whereby lowering the ratio of the low-molecular weight components including the bi-nuclear phenol body to increase the weight-average molecular weight. Thereafter, this was cooled; and then, 2.06 g of ion-exchanged water (for adjustment of the concentration) was added to it to obtain the alkaline solution (PC Material VI) of the secondarily reacted phenol resin. The concentration of the resin component (active ingredient) in this solution was 15.2% by mass; the weight-average molecular weight of this resin was 9,200; and pH of the solution was 12.6.

Production Example 7: Production of the Pitch-Formation Suppressor (PC Material) VII Into a separable flask equipped with a stirrer, a thermometer, and a reflux condenser was taken 450.0 g of cresol; and then, 200.0 g of an aqueous solution of formaldehyde with the concentration of 37% by mass was added to it. Thereafter, as the catalyst, 3.0 g of oxalic acid was added to it; and then, after the resulting mixture was heated by a heater to 95° C. with stirring the system, the reaction was continued for 4 hours with keeping this temperature. Then, the dehydration and concentration was carried out under a normal pressure with raising the temperature to 200° C.; and, when the temperature reached 200° C., the unreacted cresol was distilled out under the reduced pressure of 5.3 kPa. In this way, 350 g of the yellow and transparent novolak cresol resin (weight-average molecular weight of 2,000) was obtained.

Into a separable flask equipped with a stirrer, a thermometer, and a reflux condenser were taken 200.0 g of the obtained resin and 400.0 g of methanol; and then, after the resulting mixture was heated to 40° C. by a heater, it was stirred for 1 hour to dissolve the obtained resin into methanol. Then, 400.0 g of ion-exchanged water was added to it. By this operation a resin was separated out, and then, the solid-liquid separation thereof was carried out. Then, by carefully removing the portion of the separated solution, a resin was obtained. The resin thus obtained was further treated with the same operation twice to finally obtain 43.0 g of the resin.

Next, into a beaker were taken 40.0 g of the obtained resin, 209.5 g of ion-exchanged water, and 16.5 g an aqueous solution of sodium hydroxide with the concentration of 48% by mass; and then, the resulting mixture was dissolved by stirring it with a magnetic stirrer to obtain 260 g of the alkaline solution (PC Material VII) of the separation-purified novolak cresol resin. The concentration of the resin component (active ingredient) in this solution was 15.4% by mass; the weight-average molecular weight of this resin was 2,600; and pH of the solution was 11.9.

Production Example 8: Production of the Pitch-Formation Suppressor (PC Material) VIII Into a separable flask equipped with a stirrer, a thermometer, and a reflux condenser were taken 110.0 g of Resitop PSM-4324 (manufactured by Gunei Chemical Industry Co., Ltd.) and 110.0 g of ethanol; and then, after the resulting mixture was heated to 70° C. by a heater, it was stirred for 2 hours to dissolve PSM-4324 into ethanol. Then, after the resin solution was cooled to 40° C. or lower, 84.1 g of diethanol amine was added to it, which was then followed by addition of 64.9 g of an aqueous solution of formaldehyde with the concentration of 37% by mass. Thereafter, the temperature thereof was raised to 70° C. with stirring the system; and then, this was kept for 15 hours to modify the PSM-4324 by diethanol amine. Then, after the system was cooled to 40° C. or lower, 80.0 g of an aqueous solution of sodium hydroxide with the concentration of 30.0% by mass was added to it. After this was well stirred to make it a homogeneous solution, ethanol was distilled out by heating under reduced pressure; and finally, appropriate amount of ion-exchanged water was added to it to adjust the concentration thereof. In this way, 1300 g of the alkaline solution (PC Material VIII) of the product of the Mannich reaction of PSM-4324 was obtained. The concentration of the resin component (active ingredient) in this solution was 15.4% by mass; and pH of the solution was 12.2.

Production Example 9: Production of the Pitch-Formation Suppressor (PC Material) IX Into a separable flask equipped with a stirrer, a thermometer, and a reflux condenser was taken 450.0 g of cresol; and then, 200.0 g of an aqueous solution of formaldehyde with the concentration of 37% by mass was added to it. Thereafter, as the catalyst, 3.0 g of oxalic acid was added to it; and then, after the resulting mixture was heated by a heater to 95° C. with stirring the system, the reaction was continued for 4 hours with keeping this temperature. Then, the dehydration and concentration was carried out under a normal pressure with raising the temperature to 200° C.; and, when the temperature reached 200° C., the unreacted cresol was distilled out under the reduced pressure of 5.3 kPa. In this way, 350 g of the yellow and transparent novolak cresol resin (weight-average molecular weight of 2,000) was obtained.

Next, into a separable flask equipped with a stirrer, a thermometer, and a reflux condenser were taken 110.0 g of the obtained resin and 110.0 g of ethanol; and then, after the resulting mixture was heated to 70° C. by a heater, it was stirred for 2 hours to dissolve the resin into ethanol. Then, after the resin solution was cooled to 40° C. or lower, 84.1 g of diethanol amine was added to it, which was then followed by addition of 64.9 g of an aqueous solution of formaldehyde with the concentration of 37% by mass. Thereafter, the temperature thereof was raised to 70° C. with stirring the system; and then, this was kept for 15 hours to modify the cresol resin by diethanol amine. Then, after the system was cooled to 40° C. or lower, 80.0 g of an aqueous solution of sodium hydroxide with the concentration of 30.0% by mass was added to it. After this was well stirred to make it a homogeneous solution, ethanol was distilled out by heating under reduced pressure; and finally, appropriate amount of ion-exchanged water was added to it to adjust the concentration thereof. In this way, 1320 g of the alkaline solution (PC Material IX) of the product of the Mannich reaction of the cresol resin was obtained. The concentration of the resin component (active ingredient) in this solution was 15.4% by mass; and pH of the solution was 13.0.

Meanwhile, the list of the pitch-formation suppressors (PC Materials) I to IX is shown in Table 4.

<Measurement Method of the Weight-Average Molecular Weight>

Meanwhile, the weight-average molecular weight of each sample was measured by a gel permeation chromatography (GPC) as shown below.

(Preparation of the Sample for Measurement of the Molecular Weight)

If the sample is soluble in a tetrahydrofuran solution, this was used as the sample for measurement of the molecular weight as it is. On the other hand, if the sample is insoluble in a tetrahydrofuran solution, the sample for measurement of the molecular weight was prepared by the following procedure.

That is, if the sample is an alkaline solution, because it is insoluble in tetrahydrofuran, both the alkaline metal ion and water need to be removed without flowing out of low-molecular weight components in the resin.

Therefore, the sample, i.e., the alkaline solution, was diluted to the concentration of about 0.1% by mass; and then, hydrochloric acid was gradually added to prepare a suspended solution with the pH thereof being lowered to 4.6. Then, this suspended solution was put into a dialysis tube; and then, after the tube was sealed, it was put in a tray in which pure water could run continuously, whereby carrying out the dialysis for 24 hours. Thereafter, the suspended solution taken out from the dialysis tube was filtered with a glass filter; and after the recovered resin was washed by pure water, it was dried in a vacuum dryer at room temperature for 48 hours to obtain the sample for measurement of the molecular weight.

(Measurement of the Weight-Average Molecular Weight)

The sample for measurement of the molecular weight was prepared as the tetrahydrofuran solution thereof; and the measurement was made by using HLC 8022 (manufactured by Tosoh Corp.) as the column and tetrahydrofuran as the solvent. The weight-average molecular weight was obtained as the equivalent value with the standard polystyrene.

[Evaluation Test of Each PC Material]
(1) Simulation Test 1

In this test, the preventive effect for attachment of the pitch to paper making appliances, especially to a wire, is simulated. Comparison is made with the blank condition in which the chemical is not added; and the evaluation is made such that when amount of the attached pitch is smaller, the preventive effect of the chemical to the troubles due to the pitch is higher.

Examples 1 to 4

A commercially available carton box was broken by beating in 350 mL of CSF (Canadian standard freeness) by using Niagara Beater L23 (manufactured by Toyo Seiki Seisaku-sho, Ltd.) to obtain a pulp slurry, which was then diluted by tap water to obtain the pulp solution diluted to the concentration thereof being 0.1% by mass. Into 1,000 mL of the pulp solution were added 20 mL of an ethanol solution having mixed therein 1% by mass of potassium hydroxide, 4% by mass of tall oil as the resin pitch component, and 2% by mass of rosin as well as 7 mL of a calcium chloride solution with the concentration of 2.7% by mass; and then, pH of the resulting mixture was adjusted by hydrochloric acid at 7 or 9 to obtain the prepared solution. To this prepared solution was added the pitch-formation suppressor shown in Table 1; and after a nylon wire was suspended in the resulting solution, this was stirred at 40° C. for 12 hours. By comparing the pitch amount attached to the wire after this stirring, effect of the PC Material was compared with each other. The wire after this stirring was dried at 80° C. for 2 hours; and the attached pitch amount was calculated from the difference in the masses before and after the drying. The test results of the respective chemicals are shown in Table 1.

Comparative Example 1

The same procedure as Example 1 was repeated except that the pitch-formation suppressor was not added. The result of this is shown in Table 1.

Comparative Examples 2 to 6

The same procedure as Example 1 was repeated except that the kind of the pitch-formation suppressor and the concentration of the active ingredient contained therein were changed as shown in Table 1. These results are shown in Table 1.

Meanwhile, in Comparative Examples 5 and 6, PC Material I or PC Material II was diluted to the concentration of 10% by mass by pure water; and then, 1-N hydrochloric acid was gradually added to the solution while slowly stirring it till pH of 6 to separate out the phenol resin. The filtration residue obtained by filtering this mixture was used.

TABLE 1

| | Pitch-formation suppressor | | | Concentration of active ingredient in prepared solution (mg/L) | Attached pitch amount (g) | |
|---|---|---|---|---|---|---|
| | Kind | Maker | Kind of active ingredient | | Test at pH 7 | Test at pH 9 |
| Comparative Example 1 | Blank | — | — | — | 0.0535 | 0.0399 |
| Example 1 | PC Material I | | Alkaline solution of Resitop PSM-4324 (novolak phenol resin; manufactured by Gunei Chemical Industry Co., Ltd.) | 100 | 0.0060 | 0.0145 |
| Example 2 | PC Material II | | Alkaline solution of secondarily reacted phenol resin of Resitop PSM-6358 (novolak phenol resin; manufactured by Gunei Chemical Industry Co., Ltd.) | 100 | 0.0051 | 0.0133 |
| Example 3 | PC Material III | | Acid solution of the product of Mannich reaction of novolak cresol resin | 100 | 0.0053 | 0.0095 |
| Example 4 | PC Material II + Fixer Ju 648 | | Mixture of PC Material II and 50% by mass solution of alkylamine-epichlorohydrin condensation product (cationic quaternary salt polyamine) (wt-average molecular weight of 30,000 to 100,000); PC Material II:condensation product = 100:50 (mass ratio of active ingredients) | 100:50 | 0.0051 | 0.0073 |
| Comparative Example 2 | Kuristuck B100 | Kurita Water Industries Ltd. | Melamine resin Solution of 8% by mass | 100 | 0.0208 | 0.0185 |

TABLE 1-continued

| | Pitch-formation suppressor | | | Concentration of active ingredient in prepared solution (mg/L) | Attached pitch amount (g) | |
|---|---|---|---|---|---|---|
| | Kind | Maker | Kind of active ingredient | | Test at pH 7 | Test at pH 9 |
| Comparative Example 3 | Fixer Ju 614 | Kurita Water Industries Ltd. | Alkylamine-epichlorohydrin condensation product (cationic quaternary salt polyamine) Solution of 50% by mass (wt.-average molecular weight of 100,000 to 300,000) | 100 | 0.0460 | 0.0357 |
| Comparative Example 4 | Mistron Vapor | Nihon Mistron Co., Ltd. | Powdered talc | 200 | 0.0435 | 0.0248 |
| Comparative Example 5 | Phenol resin separated out from PC Material I by adjusting pH at 6 by hydrochloric acid (filtration residue) | | | 100 | 0.0442 | 0.0293 |
| Comparative Example 6 | Phenol resin separated out from PC Material II by adjusting pH at 6 by hydrochloric acid (filtration residue) | | | 100 | 0.0437 | 0.0272 |

From Table 1, it can be seen that Examples 1 to 4 in which PC Materials I, II, and III were respectively contained therein showed smaller amount of the attached pitch and higher preventive effect of the troubles due to the pitch as compared with Comparative Example 1 in which the pitch-formation suppressor was not added and with Comparative Examples 2 to 6 in which chemicals other than those of the present invention were used.

In addition, at pH 9, it can be seen that the preventive effect of the troubles due to the pitch is high by concurrently using the cationic polymer.

(2) Actual Equipment Test 1

This test shows the examples that the troubles due to the pitch could be prevented by adding the pitch-formation suppressor to the pulp raw material slurry.

Example 5

This test was done in the factory to manufacture the base paper for a carton box.

(Operation Conditions of the Test)

In the factory to manufacture the base paper, a craft pulp and a used carton box paper had been used as the raw materials for it, and these had been treated by using the chemical of Comparative Example 2; and when the blending ratio of the used carton box paper was increased from 50% by mass to 80% by mass for the test purpose, the pitch was attached to the appliance in the drying process and then transferred to the product, so that the pitch stains with the diameter of 2 mm or larger were attached to the product thereby causing deterioration of the product quality. Therefore, before and after when the blending ratio of the used carton box paper was increased from 50% by mass to 80% by mass, the component of the attached substance was changed from the resin pitch to the hydrophobic pitch derived from the sticky substance from the used paper.

(Addition of the Chemicals)

Under the operation conditions as mentioned above, the pitch-formation suppressor shown in Table 2 was added such that the concentration of the active ingredient therein might become as shown in Table 2. Thereafter, number of the pitch stains with the diameter of 2 mm or larger which were attached to the product that was produced during the period of 1 hour was counted. The result of this is shown in Table 2.

Comparative Example 7

The same procedure as Example 5 was repeated except that the pitch-formation suppressor was not added. The result of this is shown in Table 2.

Comparative Examples 8 and 9

The same procedure as Example 5 was repeated except that the kind of the pitch-formation suppressor and the concentration of the active ingredient therein were changed as shown in Table 2. These results are shown in Table 2.

TABLE 2

| | Pitch-formation suppressor | | | Concentration of active ingredient (g/1,000-kg pulp) | Number of pitches (pitches/hour) |
|---|---|---|---|---|---|
| | Kind | Maker | Kind of active ingredient | | |
| Comparative Example 7 | Blank | — | — | — | 22.3 |
| Example 5 | PC Material II | | Alkaline solution of secondarily reacted phenol resin of Resitop PSM-6358 (novolak phenol resin; manufactured by Gunei Chemical Industry Co., Ltd.) | 100 | 4.4 |
| Comparative Example 8 | Kuristuck B100 | Kurita Water Industries Ltd. | Melamine resin Solution of 8% by mass | 100 | 10.5 |
| Comparative Example 9 | Fixer Ju 614 | Kurita Water Industries Ltd. | Alkylamine-epichlorohydrin | 100 | 13.2 |

TABLE 2-continued

| | | Pitch-formation suppressor | | |
|---|---|---|---|---|
| Kind | Maker | Kind of active ingredient | Concentration of active ingredient (g/1,000-kg pulp) | Number of pitches (pitches/hour) |
| | | condensation product (cationic quaternary salt polyamine) Solution of 50% by mass | | |

From Table 2, it can be seen that the treatment shown in Example 5 in which PC Material II was used could decrease the number of the pitches in the product as compared with the treatment shown in Comparative Example 7 in which the chemical was not used and with the treatment shown in Comparative Examples 8 or 9 in which other chemical was used.

(3) Actual Equipment Test 2

This test shows the examples that the troubles due to the pitch could be prevented by adding the pitch-formation suppressor to the showering water of the paper making appliance thereby preventing the fouling of the appliance.

Example 6

The test was carried out in the factory to manufacture the base paper of a carton box. In this factory, the used paper of the carton box had been used as the raw material, wherein the hydrophobic pitches derived from the sticky substance in the used paper had been attached to the wire and the felt, and especially to the roll of the pressing part, thereby these pitches had been transferred to the paper to cause the defects with the frequency of 1.5 defects/10-km; and therefore, this had been causing deterioration of the product quality and of the productivity.

Therefore, PC Material II was added to the adding water to the water doctor of the roll with the amount of 100 mg per 1 liter of the showering water; and as a result, there was no attachment to the press roll recognized, thereby generation of the detects could be reduced to 0.4 defects/10-km, so that the product quality as well as the productivity could be improved.

(4) Simulation Test 2

By using the slurry of the paper manufacturing factory as the sample, the following test was carried out.

This test was carried out to confirm the removal effects of the pitch and the ink in the floatation process of the used paper treatment process. As compared with the blank test in which the chemical is not added, if the pitch concentration and the ink concentration are lower in the slurry after the floatation, the brightness is higher, and the ink concentration in the froth is higher, it is evaluated that the pitch-formation suppressor has higher effect in removing the pitch and the ink from the slurry by attaching them to the foams.

<Measurements>

Meanwhile, various measurements were carried out in the ways as shown below.

(Concentration of the Suspended Matters in the Pulp Slurry after the Floatation Process)

Concentration of the suspended matters in the pulp slurry after the floatation process was measured by the method according to JIS K0102.

(Concentration of the Pitch in the Slurry after the Floatation Process)

The pulp slurry taken out after the floatation process was evaporated to dryness; and then, Soxhlet extraction thereof was carried out by using dichloromethane. Concentration of the pitch (adhesive, synthetic resin, and so forth that were mixed into the pulp) was calculated from the extracted mass. Meanwhile, the lower the pitch concentration is, the higher the evaluation is.

(Concentration of the Ink in the Slurry and in the Froth after the Floatation Process)

Aluminum sulfate was added to the pulp slurry and the froth that were taken out after the floatation process until agglomeration reaction did not take place furthermore; and then, two pulp sheets for evaluation were prepared by using the TAPPI sheet machine by the method according to JIS P8209. Brightness of each of the pulp sheets thus obtained was measured by using the Hunter brightness meter by the method according to JIS P8123. Measurement of the brightness was done at 5 spots in each sheet, and the average value of them was taken as the brightness.

Separately, two pulp sheets for the calibration curve were prepared similarly to the above method by adding the prescribed amount of the ink to the virgin pulp slurry. Brightness of each of the pulp sheet thus obtained was measured similarly to the above method; and the calibration curve of the ink amount versus brightness was obtained.

Thereafter, the ink amount was obtained from the brightness of each of the afore-mentioned pulp sheets for evaluation by using the said calibration curve. The ink concentration was obtained by dividing this ink amount with the volume of the pulp slurry or the froth; these having been taken out for preparation of the sheet. By using this value, percentage by mass of the ink concentration relative to the solid concentration was obtained. Meanwhile, the lower the ink concentration in the slurry after the floatation process is, the higher the evaluation is; and also the higher the ink concentration in the froth is, the higher the evaluation is.

(Brightness of the Pulp Sheet Prepared from the Slurry after the Floatation Process)

From the pulp slurry which was taken out after the floatation process, two pulp sheets for measurement of brightness were prepared by using the TAPPI sheet machine by the method according to JIS P8209. Brightness of each of the pulp sheets thus obtained was measured by using the Hunter brightness meter by the method according to JIS P8123. Measurement of the brightness was done at 5 spots in each sheet, and the average value of them was taken as the brightness.

Examples 7 to 10

In the used paper pulp manufacturing process in which the deinking treatment is carried out by using newspapers and flier papers as the used paper raw material, the original water of the first floatator was used as the sample (namely, the slurry before the floatation process).

After 5 liters of the said sample and the pitch-formation suppressor shown in below Table 3 were added such that the concentration of the active ingredient therein might become as shown in Table 3, this mixture was stirred for 30 seconds in the small-type MT Floatator (manufactured by IHI Machinery and Furnace Co., Ltd.). Then, the floatation treatment was carried out for 3 minutes with the air flow rate of 3 L/minute. The results of them are shown in Table 3.

Meanwhile, PC Material II and PC Material III shown in Table 3 were those which were prepared in Example 2 and Example 3, respectively.

Comparative Example 10

The same procedure as Example 7 was repeated except that the pitch-formation suppressor was not used. The result of this is shown in Table 3.

Comparative Examples 11 to 18

The same procedure as Example 7 was repeated except that the kind of the pitch-formation suppressor and the concentration of the active ingredient contained therein were changed as shown in Table 3. These results are shown in Table 3.

TABLE 3

| | Pitch-formation suppressor | | | Slurry after floatation treatment |
|---|---|---|---|---|
| | Kind | Concentration of active ingredient in aqueous sample solution mg/L | Concentration of active ingredient relative to pulp g/1,000-kg pulp | Concentration of suspended matters mg/L |
| Comparative Example 10 | — | 0 | 0 | 7129 |
| Example 7 | PC Material II | 5 | 450 | 7086 |
| Example 8 | | 10 | 900 | 6952 |
| Example 9 | PC Material III | 5 | 450 | 7100 |
| Example 10 | | 10 | 900 | 7013 |
| Comparative Example 11 | Zeta Ace P-702 (*1) | 5 | 450 | 7130 |
| Comparative Example 12 | | 10 | 900 | 7121 |
| Comparative Example 13 | | 20 | 1800 | 7075 |
| Comparative Example 14 | | 40 | 3600 | 6800 |
| Comparative Example 15 | Fixer Ju 614 (*2) | 20 | 1800 | 6901 |
| Comparative Example 16 | | 40 | 3600 | 6710 |
| Comparative Example 17 | Phenol resin separated out from PC Material II by adjusting pH at 6 by hydrochloric acid (filtration residue) | 5 | 450 | 7133 |
| Comparative Example 18 | | 10 | 900 | 7138 |

| | Slurry after floatation treatment | | | | | Froth |
|---|---|---|---|---|---|---|
| | Pitch concentration | | Ink concentration | | | |
| | mg/L | % by mass (vs. suspended matters) | mg/L | % by mass (vs. suspended matters) | Brightness — | Ink concentration mg/L |
| Comparative Example 10 | 242 | 3.4 | 30.30 | 0.43 | 59.0 | 89 |
| Example 7 | 227 | 3.2 | 27.10 | 0.38 | 61.3 | 95 |
| Example 8 | 212 | 3.0 | 24.70 | 0.36 | 61.6 | 100 |
| Example 9 | 230 | 3.2 | 27.40 | 0.39 | 61.8 | 95 |
| Example 10 | 222 | 3.2 | 25.10 | 0.36 | 62.2 | 99 |
| Comparative Example 11 | 246 | 3.5 | 30.60 | 0.43 | 59.2 | 88 |
| Comparative Example 12 | 250 | 3.5 | 31.00 | 0.44 | 59.1 | 89 |
| Comparative Example 13 | 250 | 3.5 | 29.00 | 0.41 | 58.3 | 90 |
| Comparative Example 14 | 255 | 3.8 | 33.00 | 0.49 | 58.2 | 87 |
| Comparative Example 15 | 250 | 3.6 | 29.80 | 0.43 | 59.3 | 88 |
| Comparative Example 16 | 258 | 3.8 | 34.50 | 0.51 | 57.8 | 86 |

TABLE 3-continued

|  | | | | | | |
|---|---|---|---|---|---|---|
| Comparative Example 17 | 245 | 3.4 | 30.50 | 0.43 | 58.9 | 88 |
| Comparative Example 18 | 243 | 3.4 | 30.90 | 0.43 | 58.7 | 87 |

(*1) Zeta Ace P-702 (poly-DADMAC (diallyl dimethyl ammonium chloride); wt.-average molecular weight of 3,000,000; manufactured by Kurita Water Industries, Ltd.)
(*2) Fixer Ju 614 (alkylamine-epichlorohydrin condensation product; 50% aqueous solution; wt-average molecular weight of 100,000 to 300,000; manufactured by Kurita Water Industries, Ltd.)

As compared with Comparative Examples 11 to 16, in Examples 7 to 10, the pitch concentration and the ink concentration of the slurry after the floatation treatment are lower, and also brightness of the obtained pulp sheet was higher.

In addition, as shown in Comparative Examples 11 to 16, when the addition amount of the pitch-formation suppressor in each of Comparative Examples is small, there is no difference from the case without addition thereof (Comparative Example 10); and in addition, when the concentration of the active ingredient contained in the pitch-formation suppressor in Comparative Examples is increased, the pitch concentration and the ink concentration in the slurry after the floatation treatment increase thereby lowering brightness of the pulp sheet obtained therefrom. As the reason for this, it is assumed that these pitch-formation suppressors in Comparative Examples are cationic, and therefore they fix the pitch and the ink to the pulp fibers which have an anionic character. As discussed above, it is clear that the pitch-formation suppressors of the present invention express the excellent effects.

In addition, as shown in Comparative Examples 17 and 18, even if the phenol resin was added as a solid, as compared with the case without addition thereof (Comparative Example 10), there were no changes in the pitch concentration, the ink concentration, and brightness. Accordingly, it is apparent that the pitch-formation suppressor of the present invention can express its superior effect because it is in the form of the solution.

(5) Simulation Test 3

This test is to evaluate the concentration of suspended matters in the pulp slurry wherein the pitch-formation suppressor can work more effectively. When the turbidity is lower and the turbidity removal rate is higher as compared with the case without addition of the chemical, it is evaluated that the pitch is fixed to fibers more so that the effect of the chemical is higher.

Examples 11 to 34

A commercially available LBKP sheet was broken by beating in 200 mL of CSF (Canadian standard freeness) by using Niagara Beater L23 (manufactured by Toyo Seiki Seisaku-sho, Ltd.) to obtain a pulp slurry, which was then diluted by the phosphate buffer whose pH was adjusted at 6.5 to obtain the pulp slurry for testing diluted to the concentration of 0.5% by mass.

To 180 mL of this pulp slurry for testing was added Regitex A-6001 (manufactured by Regitex Co., Ltd.) as the simulation pitch such that the concentration thereof might become 100 mg/L relative to the slurry; and then, this mixed solution was stirred at 800 rpm by a hand mixer for 10 seconds. Thereafter, each of PC Materials I, II, and IV to IX as shown in Table 4 was added to the said mixed solution such that the concentration of the active ingredient contained therein might become 20 mg/L, 50 mg/L, and 100 mg/L, respectively; and then, each of the resulting solution was stirred for further 30 seconds. After this solution was filtrated by suction filtration with a filter paper having pore diameter of 1 µm, turbidity of the filtrate was measured by a usual way by using the portable-type turbidity meter 2100P (manufactured by HACH Company); and the turbidity removal rate was evaluated by the following equation (1). These results are shown in Table 5. The turbidity removal rate is in proportion to decrease in the amount of the simulation pitch in the filtrate; and this means that when the turbidity removal rate is higher, more amount of the simulation pitch is fixed to the pulp fibers by this particular chemical.

$$\text{Turbidity removal rate} = [(\text{turbidity without addition of chemical}) - (\text{turbidity of Example})]/(\text{turbidity without addition of chemical}) \times 100 (\%) \quad (1)$$

Comparative Example 19

The same procedure as Examples 11 to 34 was repeated except that the pitch-formation suppressor was not added. The result of this is shown in Table 5.

Examples 35 to 58

A commercially available LBKP sheet was broken by beating in 200 mL of CSF (Canadian standard freeness) by using Niagara Beater L23 (manufactured by Toyo Seiki Seisaku-sho, Ltd.) to obtain a pulp slurry, which was then diluted by the phosphate buffer whose pH was adjusted at 6.5 to obtain the pulp slurry for testing diluted to the concentration of 1.0% by mass.

To 180 mL of this pulp slurry for testing was added Regitex A-6001 (manufactured by Regitex Co., Ltd.) as the simulation pitch such that the concentration thereof might become 100 mg/L relative to the slurry; and then, this mixed solution was stirred at 800 rpm by a hand mixer for 10 seconds. Thereafter, each of PC Materials I, II, and IV to IX as shown in Table 4 was added to the said mixed solution such that the concentration of the active ingredient contained therein might become 20 mg/L, 50 mg/L, and 100 mg/L, respectively; and then, each of the resulting solutions was stirred for further 30 seconds. Then, this solution was diluted by the tap water such that this might become the slurry having the concentration of 0.5% by mass. After this was filtrated by suction filtration with a filter paper having pore diameter of 1 µm, turbidity of the filtrate was measured by a usual way by using the portable-type turbidity meter 2100P (manufactured by HACH Company); and then, the turbidity removal rate was evaluated by the above equation (1). These results are shown in Table 5 and Table 6. The turbidity removal rate is in proportion to decrease in the amount of the simulation pitch in the filtrate; and this means that when the turbidity removal rate is higher, more amount of the simulation pitch is fixed to the pulp fibers by this particular chemical.

Comparative Example 20

The same procedure as Examples 35 to 58 was repeated except that the pitch-formation suppressor was not added. The result of this is shown in Table 5.

Examples 59 to 82

The same procedure as Examples 35 to 58 was repeated except that the pulp slurry for testing was diluted by the phosphate buffer having pH of 6.5 such that the concentration thereof might become 2.0% by mass. These results are shown in Table 6.

Comparative Example 21

The same procedure as Examples 59 to 82 was repeated except that the pitch-formation suppressor was not added. The result of this is shown in Table 5.

TABLE 4

List of the pitch-formation suppressors
Pitch-formation suppressor

| Kind | Kind of active ingredient |
|---|---|
| PC | Alkaline solution of Resitop PSM-4324 (novolak phenol resin; manufactured by Gunei Chemical Industry Co., Ltd.) |
| Material I | |
| PC Material II | Alkaline solution of secondarily reacted phenol resin of Resitop PSM-6358 (novolak phenol resin; manufactured by Gunei Chemical Industry Co., Ltd.) |
| PC Material III | Acid solution of Mannich reaction product of novolak cresol resin |
| PC Material IV | Alkaline solution of separation-purified phenol resin of Resitop PSM-6358 (novolak phenol resin; manufactured by Gunei Chemical Industry Co., Ltd.) |
| PC Material V | Alkaline solution of novolak cresol resin |
| PC Material VI | Alkaline solution of secondarily reacted cresol resin of novolak cresol resin |
| PC Material VII | Alkaline solution of separation-purified cresol resin of novolak cresol resin |
| PC Material VIII | Alkaline solution of Mannich reaction product of Resitop PSM-4324 (novolak phenol resin; manufactured by Gunei Chemical Industry Co., Ltd.) |
| PC Material IX | Alkaline solution of Mannich reaction product of novolak cresol resin |

TABLE 5

Results of simulation test 3

| | Concentration of suspended matters (%) | Pitch-formation suppressor | Concentration of active ingredient in the prepared solution (mg/L) | Turbidity (NTU) Filtrate of 1 μm pore | Turbidity removal rate (%) Filtrate of 1 μm pore |
|---|---|---|---|---|---|
| Comparative Example 19 | 0.5 | — | 0 | 48.2 | 0.0 |
| Comparative Example 20 | 1.0 | — | 0 | 41.8 | 0.0 |
| Comparative Example 21 | 2.0 | — | 0 | 37.92 | 0.0 |
| Example 11 | 0.5 | PC | 20 | 21.0 | 56.4 |
| Example 12 | 0.5 | Material | 50 | 9.6 | 80.2 |
| Example 13 | 0.5 | I | 100 | 4.6 | 90.4 |
| Example 14 | 0.5 | PC | 20 | 15.7 | 67.4 |
| Example 15 | 0.5 | Material | 50 | 5.1 | 89.4 |
| Example 16 | 0.5 | II | 100 | 1.9 | 96.1 |
| Example 17 | 0.5 | PC | 20 | 15.9 | 67.0 |
| Example 18 | 0.5 | Material | 50 | 5.5 | 88.6 |
| Example 19 | 0.5 | IV | 100 | 2.6 | 94.6 |
| Example 20 | 0.5 | PC | 20 | 17.8 | 63.1 |
| Example 21 | 0.5 | Material | 50 | 6.8 | 86.0 |
| Example 22 | 0.5 | V | 100 | 4.0 | 91.7 |
| Example 23 | 0.5 | PC | 20 | 17.8 | 63.1 |
| Example 24 | 0.5 | Material | 50 | 4.8 | 90.0 |
| Example 25 | 0.5 | VI | 100 | 2.7 | 94.4 |
| Example 26 | 0.5 | PC | 20 | 13.8 | 71.4 |
| Example 27 | 0.5 | Material | 50 | 4.5 | 90.8 |
| Example 28 | 0.5 | VII | 100 | 1.8 | 96.3 |
| Example 29 | 0.5 | PC | 20 | 22.1 | 54.1 |
| Example 30 | 0.5 | Material | 50 | 6.5 | 86.5 |
| Example 31 | 0.5 | VIII | 100 | 4.1 | 91.5 |
| Example 32 | 0.5 | PC | 20 | 19.0 | 60.6 |
| Example 33 | 0.5 | Material | 50 | 9.0 | 81.4 |
| Example 34 | 0.5 | IX | 100 | 3.6 | 92.5 |
| Example 35 | 1.0 | PC | 20 | 31.0 | 25.8 |
| Example 36 | 1.0 | Material | 50 | 24.6 | 41.1 |
| Example 37 | 1.0 | I | 100 | 14.2 | 65.9 |
| Example 38 | 1.0 | PC | 20 | 20.6 | 50.7 |
| Example 39 | 1.0 | Material | 50 | 11.7 | 72.1 |
| Example 40 | 1.0 | II | 100 | 4.3 | 89.7 |
| Example 41 | 1.0 | PC | 20 | 21.2 | 49.3 |
| Example 42 | 1.0 | Material | 50 | 11.9 | 71.6 |
| Example 43 | 1.0 | IV | 100 | 5.7 | 86.5 |
| Example 44 | 1.0 | PC | 20 | 20.6 | 50.7 |
| Example 45 | 1.0 | Material | 50 | 10.7 | 74.4 |
| Example 46 | 1.0 | V | 100 | 7.3 | 82.6 |
| Example 47 | 1.0 | PC | 20 | 19.9 | 52.4 |
| Example 48 | 1.0 | Material | 50 | 12.9 | 69.2 |
| Example 49 | 1.0 | VI | 100 | 5.3 | 87.3 |
| Example 50 | 1.0 | PC | 20 | 17.7 | 57.7 |
| Example 51 | 1.0 | Material | 50 | 8.4 | 80.0 |
| Example 52 | 1.0 | VII | 100 | 3.8 | 90.8 |

TABLE 6

Results of simulation test 3

| | Concentration of suspended matters (%) | Pitch-formation suppressor | Concentration of active ingredient in the prepared solution (mg/L) | Turbidity (NTU) Filtrate of 1 μm pore | Turbidity removal rate (%) Filtrate of 1 μm pore |
|---|---|---|---|---|---|
| Example 53 | 1.0 | PC | 20 | 39.8 | 4.8 |
| Example 54 | 1.0 | Material | 50 | 22.8 | 45.5 |
| Example 55 | 1.0 | VIII | 100 | 6.2 | 85.2 |
| Example 56 | 1.0 | PC | 20 | 29.6 | 29.2 |
| Example 57 | 1.0 | Material | 50 | 23.2 | 44.5 |
| Example 58 | 1.0 | IX | 100 | 13.9 | 66.7 |
| Example 59 | 2.0 | PC | 20 | 39.72 | 0.0 |
| Example 60 | 2.0 | Material | 50 | 57.2 | 0.0 |
| Example 61 | 2.0 | I | 100 | 68 | 0.0 |
| Example 62 | 2.0 | PC | 20 | 19.28 | 49.2 |
| Example 63 | 2.0 | Material | 50 | 14.88 | 60.8 |
| Example 64 | 2.0 | II | 100 | 23.64 | 37.7 |
| Example 65 | 2.0 | PC | 20 | 20.84 | 45.0 |
| Example 66 | 2.0 | Material | 50 | 23.4 | 38.3 |

TABLE 6-continued

Results of simulation test 3

|  | Concentration of suspended matters (%) | Pitch-formation suppressor | Concentration of active ingredient in the prepared solution (mg/L) | Turbidity (NTU) Filtrate of 1 μm pore | Turbidity removal rate (%) Filtrate of 1 μm pore |
|---|---|---|---|---|---|
| Example 67 | 2.0 | IV | 100 | 30.2 | 20.4 |
| Example 68 | 2.0 | PC | 20 | 22.92 | 39.6 |
| Example 69 | 2.0 | Material | 50 | 22.72 | 40.1 |
| Example 70 | 2.0 | V | 100 | 31.52 | 16.9 |
| Example 71 | 2.0 | PC | 20 | 18.2 | 52.0 |
| Example 72 | 2.0 | Material | 50 | 14.8 | 61.0 |
| Example 73 | 2.0 | VI | 100 | 20.64 | 45.6 |
| Example 74 | 2.0 | PC | 20 | 13.04 | 65.6 |
| Example 75 | 2.0 | Material | 50 | 11.56 | 69.5 |
| Example 76 | 2.0 | VII | 100 | 12.76 | 66.4 |
| Example 77 | 2.0 | PC | 20 | 58.4 | 0.0 |
| Example 78 | 2.0 | Material | 50 | 56.4 | 0.0 |
| Example 79 | 2.0 | VIII | 100 | 34.2 | 9.8 |
| Example 80 | 2.0 | PC | 20 | 53.6 | 0.0 |
| Example 81 | 2.0 | Material | 50 | 23.6 | 37.8 |
| Example 82 | 2.0 | IX | 100 | 7.36 | 80.6 |

In the simulation test 3, when the concentration of the suspended matters in the slurry is lower, the turbidity removal rate becomes higher, so that the fixing effect of the simulation pitch to the chemical and to the pulp fibers becomes higher.

INDUSTRIAL APPLICABILITY

The pitch-formation suppressor of the present invention can effectively suppress and prevent the troubles due to the pitch, such as foreign spots and defects in a paper, breakage of a paper, and lowering of workability in the paper manufacturing process.

The invention claimed is:

1. A method for suppressing pitch formation, comprising: treating a novolak phenol resin or a resol phenol resin with a secondary reaction, thereby obtaining secondarily reacted phenol resin and wherein the secondary reaction excludes a presence of an amine and an aldehyde therein; and
adding a pitch-formation suppressor comprising an alkaline solution in which the secondarily reacted phenol resin is dissolved, or an acid solution in which the secondarily reacted phenol resin is dissolved, in a paper manufacturing process.

2. The method for suppressing pitch formation according to claim 1, wherein a cationic polymer is used concurrently therewith.

3. The method for suppressing pitch formation according to claim 1, wherein the pitch-formation suppressor is added into at least one selected from a chest, a pipe, an appliance, and a washing shower in at least one process, among the paper manufacturing processes, selected from a pulp manufacturing process, a washing and refining process, a preparation process, a paper making process, and a white water recovery process.

4. The method for suppressing pitch formation according to claim 1, wherein the pitch-formation suppressor is added into at least one selected from a chemical pulp, a mechanical pulp, and a used paper pulp in a pulp manufacturing process, a broke and a disk filter in a pulp recovery process, and a mixing chest, a machine chest, a seed box, and an inlet in a paper making process.

5. The method for suppressing pitch formation according to claim 4, wherein the pitch-formation suppressor is added to a process water in which concentration of suspended matters is 1.0% or less by mass.

6. The method for suppressing pitch formation according to claim 1, wherein the pitch-formation suppressor is added into a floatation process and/or a process before it in a deinking treatment of a used paper pulp manufacturing process in the paper manufacturing process.

7. The method for suppressing pitch formation according to claim 3, wherein the pitch-formation suppressor is added to at least one selected from a wire, a felt, a canvas, a roll, and a suction roll among the appliances.

8. The method for suppressing pitch formation according to claim 3, wherein the washing shower is a shower with which fouling of at least one selected from the appliance, the chest, and the equipment is prevented from occurring.

9. The method for suppressing pitch formation according to claim 1, wherein a weight-average molecular weight of the secondarily reacted phenol resin is in a range of 9,200 to 60,000.

10. A method for suppressing pitch formation, comprising:
adding an aldehyde to an alkaline solution of a raw material resin selected from the group consisting of a novolak phenol resin and a resol phenol resin, thereby carrying out addition polycondensation reaction of the raw material resin with the aldehyde and obtaining a secondarily reacted phenol resin; and
adding a pitch-formation suppressor comprising an alkaline solution in which the secondarily reacted phenol resin is dissolved, or an acid solution in which the secondarily reacted phenol resin is dissolved, in a paper manufacturing process,
wherein the addition polycondensation reaction is carried out at 85° C. for 8 hours.

* * * * *